UNITED STATES PATENT OFFICE.

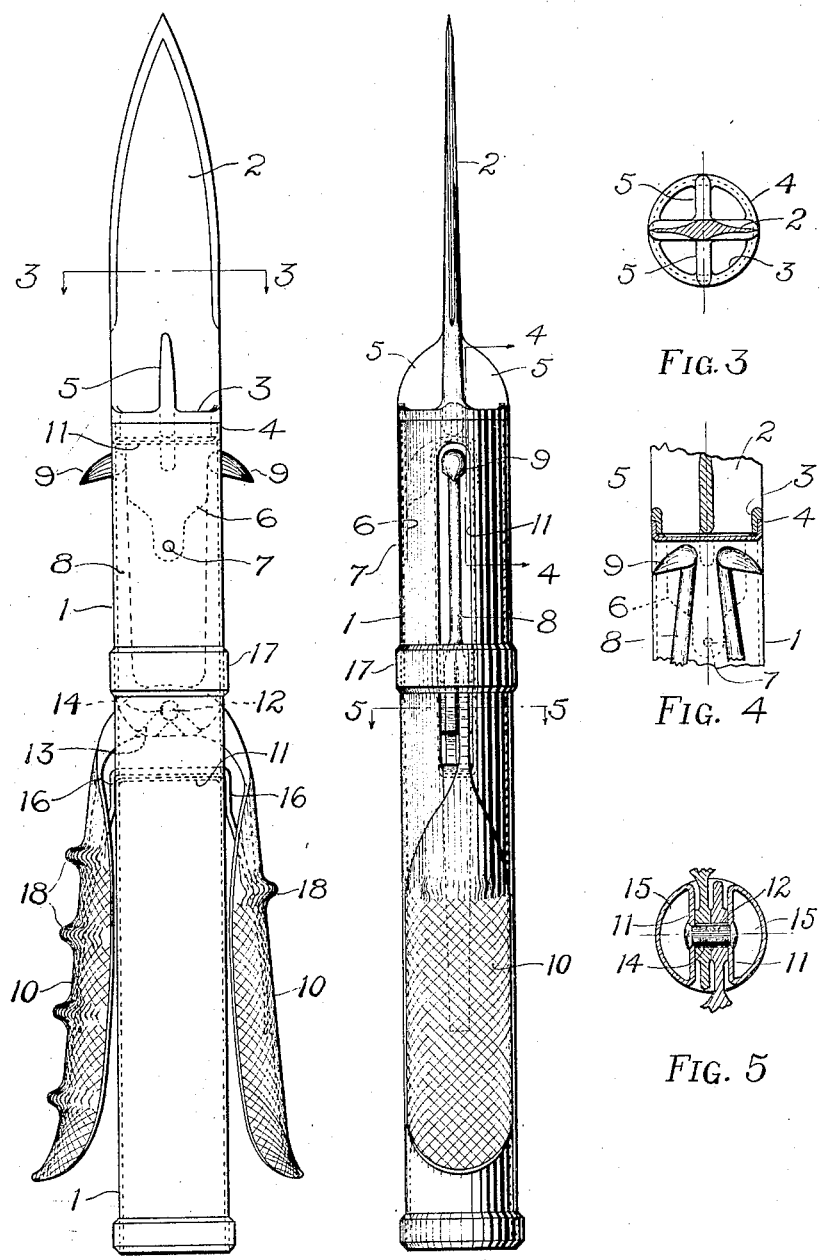

WILLIAM B. WESCOTT, OF WELLESLEY, MASSACHUSETTS, ASSIGNOR, BY MESNE ASSIGNMENTS, TO PROTEIN PRODUCTS CORPORATION, OF BOSTON, MASSACHUSETTS, A CORPORATION OF MASSACHUSETTS.

TROCAR.

1,380,447.      Specification of Letters Patent.      Patented June 7, 1921.

Application filed June 14, 1919, Serial No. 304,317. Renewed November 26, 1920. Serial No. 426,607.

*To all whom it may concern:*

Be it known that I, WILLIAM B. WESCOTT, a citizen of the United States, and resident of Wellesley, in the county of Norfolk and State of Massachusetts, have invented new and useful Improvements in Trocars, of which the following is a specification.

This invention relates to a trocar for collecting blood from food animals at the time of slaughter, and its object is to provide an instrument with which it is possible to collect the blood under ordinary slaughter house conditions free from contamination and suitable for human food or for therapeutic purposes.

The invention consists in certain modifications of the instrument described in my application for Letters Patent of the United States, Serial No. 288,641, filed April 8, 1919.

In the accompanying drawings which illustrate an embodiment of the invention—

Figure 1 is a side elevation of the instrument;

Fig. 2 is a side elevation taken at right angles to that shown in Fig. 1;

Fig. 3 is a section through the blade or perforator on line 3—3 of Fig. 1;

Fig. 4 is a fragmentary longitudinal section on line 4—4 of Fig. 2 with the retaining hooks retracted; and Fig. 5 is a cross section on line 5—5 of Fig. 2.

The trocar comprises a tube or cannula 1, to the forward end of which is positively fixed a perforator or blade 2 of considerable length having a sharp tapered point and two sharp cutting edges. The base of the elongate blade 2 is made integral with or is diametrically fixed to an annular base or collar 3 which fits snugly into the forward end of the cannula, and is provided with a rounded flange or lip 4 which fits over the end of the cannula to produce a smooth entering end which will not catch on the walls of the cut in the tissues when the instrument is being inserted into the tissues. At the base of the blade 2, and disposed at right angles thereto, are a pair of spreader members 5, 5, one on each side of the blade, bridging the opening into the end of the cannula, and made integral with or fixed to the collar 3 and blade 2. The spreader members 5 terminate short of the extremity of the blade, and present forwardly converging edge surfaces which hold the wall of the cut from collapsing across the end of the cannula and so obstructing the flow of blood therethrough.

The collar 3 has on its lower or inner side a pair of stiffly resilient tongues 6 extending into the bore of the cannula, straddling the walls presently to be described which form a housing for the retaining levers. The tongues 6 have projections or catches 7 which snap into corresponding holes or sockets in the walls of the cannula to lock the perforator firmly in place.

The lower end of the cannula 1 is adapted for connection to a pipe or tube leading to a suitable container in which the blood is collected.

To retain the trocar in position in the body of the animal after it has been inserted, and so to permit the free and continuous flow of blood through the cannula without further attention on the part of the operator, I provide a pair of crossed levers, which extend transversely through the cannula and are mounted therein on a pivot. The forward end 8 of each lever carries at its end a sharp hook 9, to engage the walls of the cut and the rear end 10 constitutes a handle or hand grip.

The cannula is formed with a lengthwise extending walled aperature or slot 11 which opens transversely through the body of the cannula and constitutes a chamber in which the forward ends of the levers and their hooks may be housed, and through which the crossed levers extend.

The forward hooked end of each lever and its rear or handle end are positioned on opposite sides of the cannula and are joined by a connecting part which extends across and through the lower end of said aperture or slot 11 of the cannula. Thus the levers pass through the body of the cannula but not through its walls into the interior or bore thereof, which is divided at this point and passes each side of the aperture 11 as indicated at 15, 15 (Fig. 5).

The crossed levers are pivoted on a pivot pin 12 mounted between the walls of the divided bore 15, 15. The levers are made demountable from the cannula for the purpose of cleansing or repair, by providing a slot 13 which leads inward to the pivot bearing 14. The levers may be removed by passing the pin 12 through slots 13 when the ring 17 is removed. Springs 16 between the under sides of the hand grips 10 and the body of the cannula normally urge the grips outward, and consequently normally urge the hooks 9 on the forward end of the levers into operative position, projected from the recesses 11 as shown in Fig. 1. The springs 16 are preferably integral parts of a U-shaped spring member, the loop end of which is lodged in the end of slot 11, so that it is readily removable when the levers are removed.

When the hand grips 10 are pressed together by the hand of the user, these hooks are retracted and housed within the aperture 11, in the position shown in Fig. 4, in which position they are contained within the periphery of the cannula and do not interfere with the introduction or withdrawal of the instrument into or from the body of the animal. But upon the release of the hand grips, after the instrument has been inserted, the springs will force the hooks 9 outwardly beyond the periphery of the cannula and into engagement with the walls of the wound thus retaining the instrument in position. A ring or band 17 limits the outward movement of the levers.

To prevent the hand of the user from slipping the handles 10 are preferably provided with ribs or corrugations 18 arranged to conform to the fingers, and to afford secure gripping surfaces.

It will be seen that none of the moving parts operate through the walls of the cannula, but all are wholly exterior of the cannula bore, and the walls of the cannula are entirely imperforate and closed against leakage of blood outwardly through the walls, or leakage of contaminating fluids inwardly.

The blade 2 is of such length that it will pierce a large blood vessel or artery without inserting the end of the cannula into the blood vessel or a great distance through the wound into the body of the animal. So long as the end of the cannula is within the lips of the cut communication is established between the blood vessel and the inlet opening of the cannula, through the walls of the cut, without exposing the blood to contamination from outside sources.

In using the instrument the operator grasps the handles 10, compressing them toward each other and so retracting the retaining hooks 9 within the slot or aperture 11. The instrument may then be inserted into a previously made cut or slit in the region of a large blood vessel such as the aorta. The blade 2 will readily penetrate the cellular tissues surrounding the blood vessel, and will sever the blood vessel, but by reason of the length of the blade 2 it will not be necessary that the tubular cannula itself should enter the blood vessel so long as it enters the cut made through the skin as the lips or walls of the wound will direct the flow of blood into the cannula. When inserted in the desired position the operator releases the handles and the retaining hooks 9 will be forced outwardly by the springs 16 and engage the walls of the cut thus holding the instrument in place until the hand levers are again compressed. The spreaders 5, 5, not only prevent the walls of the wound from collapsing across the open end of the cannula and so preventing the free flow of blood through the cannula, but also serve as braces to stiffen and strengthen the blade 2.

I claim:

1. A trocar comprising a cannula having a walled aperture extending transversely through the cannula body dividing the interior cannula passage into two imperforate parts, and crossed retaining levers extending through said aperture.

2. A trocar comprising a cannula having a walled aperture extending transversely through the cannula body dividing the interior cannula passage into two imperforate parts, a pivot bearing within said aperture, and crossed retaining levers journaled on said pivot bearing and extending through said aperture.

3. A trocar comprising a cannula having a walled aperture extending transversely through the cannula body dividing the interior cannula passage into two imperforate parts, a pivot bearing within said aperture, and crossed retaining levers removably journaled on said pivot bearing and extending through said aperture.

4. A trocar comprising a cannula having a walled aperture extending transversely through the cannula body dividing the interior cannula passage into two imperforate parts, and crossed retaining levers extending through said aperture, the forward ends of the levers being adapted to be housed in the aperture and the rear ends extending alongside the cannula to form handles.

5. A trocar comprising a cannula having a walled aperture extending transversely through the cannula body dividing the interior cannula passage into two imperforate parts, and crossed retaining levers extending through said aperture, the forward ends of the levers being adapted to be housed in the aperture and the rear ends extending alongside the cannula to form handles and a U-spring the loop of which is lodged in said aperture and the legs of which engage the under sides of the handles normally urging the same apart.

6. A trocar comprising a cannula, an annular member mounted at the end of the cannula, an elongate perforator blade the base of which is fixed diametrically of the annular member, and spreader members extending between opposite sides of the base of the blade and the annular member.

7. A trocar comprising a cannula, an annular member mounted at the end of the cannula, an elongate perforator blade the base of which is fixed diametrically of the annular member, and spreader members extending between opposite sides of the base of the blade and the annular member, the outer edges of the spreader members converging forwardly and terminating short of the extremity of the blade.

Signed by me at Boston, Massachusetts, this 13th day of June, 1919.

WILLIAM B. WESCOTT.